July 18, 1939.  S. M. SCHWELLER  2,166,707
REFRIGERATING APPARATUS
Filed Nov. 19, 1937  2 Sheets-Sheet 1

INVENTOR.
SYLVESTER M. SCHWELLER
BY Spencer, Hardman and Fahr.
HIS ATTORNEYS.

July 18, 1939.　　S. M. SCHWELLER　　2,166,707
REFRIGERATING APPARATUS
Filed Nov. 19, 1937　　2 Sheets-Sheet 2

INVENTOR.
SYLVESTER M. SCHWELLER.
BY
HIS ATTORNEYS.

Patented July 18, 1939

2,166,707

UNITED STATES PATENT OFFICE 2,166,707

REFRIGERATING APPARATUS

Sylvester M. Schweller, Dayton, Ohio, assignor to General Motors Corporation, Dayton, Ohio, a corporation of Delaware Application November 19, 1937, Serial No. 175,476

2 Claims. (Cl. 211—153)

This invention relates to shelving for refrigerator cabinets.

In some types of refrigerator cabinets, a removable pan is associated with a shelf of the refrigerator and is disposed beneath the evaporator, of a refrigerating system, located in the food storage compartment of such cabinets. The primary purpose of this pan has been to serve as a reservoir for catching water dripping from the evaporator during defrosting thereof. This pan has recently been put to a double use in such refrigerator cabinets. For example, during the time between defrosting periods of the evaporator, this pan has been utilized for the reception and storage of certain food products, since the pan is mounted in substantially the coldest part or section of the food compartment of the refrigerator cabinet. However, prior to my invention, the reception and storage of food products in the pan has been restricted to thin or small pieces of meat, such as steaks and chops or the like, due to the limited space between the pan and the bottom of the evaporator. Therefore, my invention contemplates adding to the utility of such a pan by rendering same useful for the reception and storage beneath the evaporator of relatively large pieces of meat such as roasts or the like and large poultry products such as chickens, ducks or the like.

One of the objects of my present invention is to provide an improved order of storage of food products within a refrigerated compartment of a cabinet of a refrigerating apparatus and particularly within substantially the coldest portion of the compartment by a novel shelving arrangement.

Another object of my invention is to provide a plurality of positions of support upon a shelf within a food storage compartment of a refrigerating apparatus for a pan disposed below an evaporator located within the compartment so as to change the distance between the pan and the bottom of the evaporator selectively to form unobstructed storage spaces of increased or decreased height below the evaporator.

In carrying out the foregoing objects, it is a further and more specific object of my invention to provide the various positions of support of the pan below the evaporator on and within substantially the same horizontal plane of a normally stationarily mounted shelf disposed in the food storage compartment of the refrigerator cabinet and to provide for the sliding of the pan outwardly of the shelf without interference by portions of the shelf when it is desired to change the pan from one elevation to another relative to the evaporator and to the shelf.

Further objects and advantages of the present invention will be apparent from the following description, reference being had to the accompanying drawings, wherein a preferred form of the present invention is clearly shown.

Figure 1:
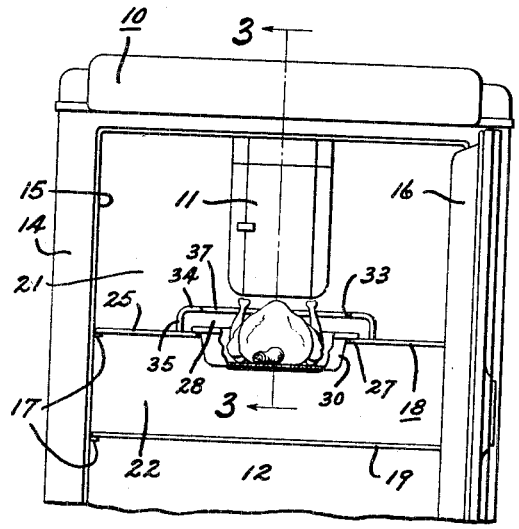
Fig. 1 is a front view of the upper part of a refrigerator cabinet showing the improved shelving therein supporting a pan in one position below the evaporator.

Referring to the drawings, for illustrating the present invention, I have shown in Fig. 1 thereof a refrigerating apparatus including a cabinet 10 having a heat absorber or evaporator 11 of a closed refrigerating system mounted within the food storage compartment 12 of the cabinet. The food compartment 12 of cabinet 10 is bounded by a plurality of insulated walls 14 and the access opening 15 of the compartment 12 is normally by an insulated door structure 16. A plurality of pegs or hooks 17 are secured to the vertical food compartment walls and have shelves 18 and 19 normally stationarily supported thereon. The evaporator or heat absorber 11 is of the usual or conventional type, having a freezing compartment provided therein for the reception of ice trays containing water to be frozen. The ice tray or freezing compartment is bounded by a plurality of refrigerated walls of the evaporator 11 and its open front is preferably closed by a door to prevent the air, cooled and circulated by the refrigerating effect of the evaporator, within food compartment 12 from entering the freezing compartment.

Figure 4:
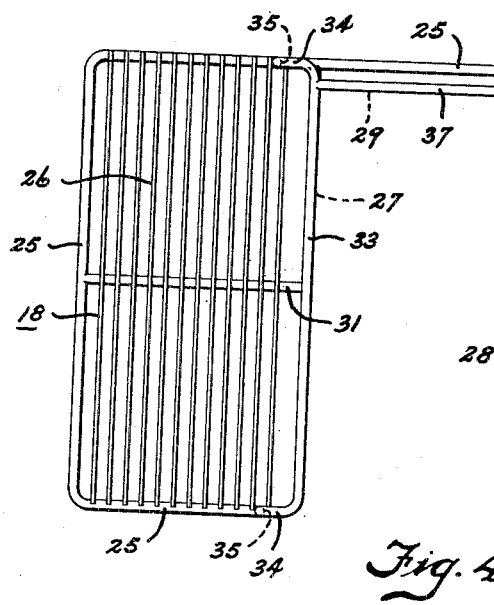
Fig. 4 is a top plan view of the improved shelf constructed in accordance with the present invention.
Figure 4:
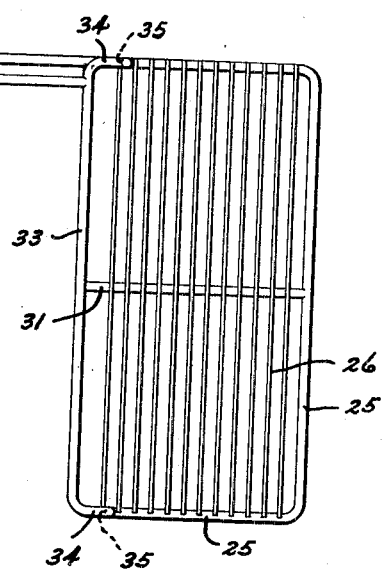
Figure 3:
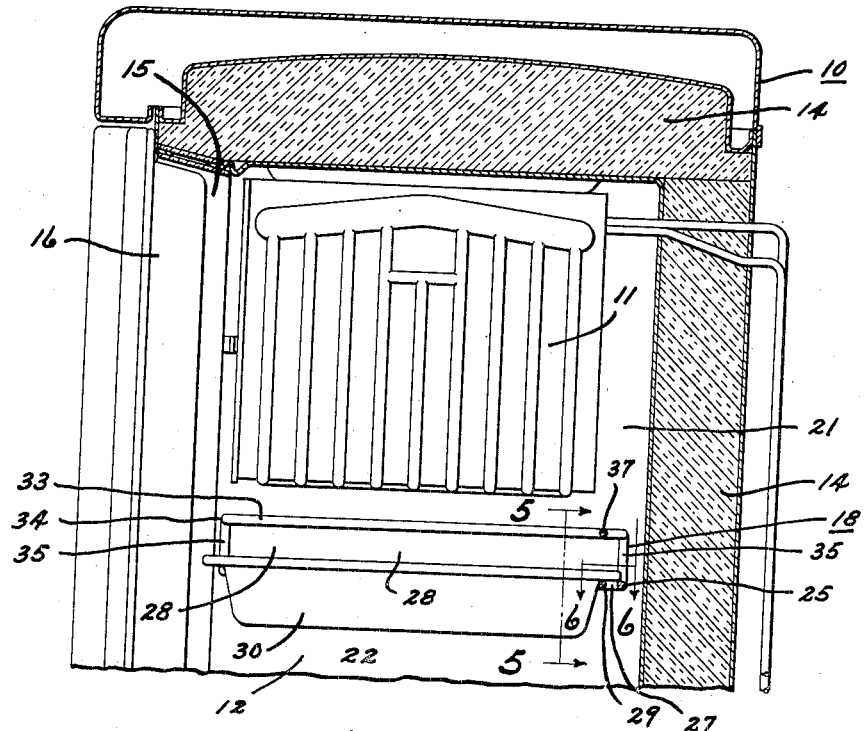
Fig. 3 is a cross-sectional view of the improved shelving and is taken on the line 3—3 of Fig. 1.
Figure 5:
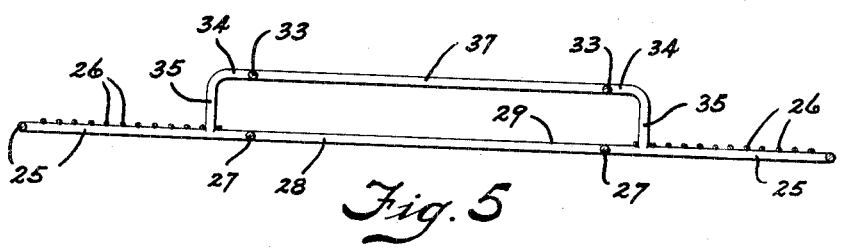
Fig. 5 is a vertical sectional view of the improved shelf taken on the line 5—5 of Fig. 3.
Figure 6:
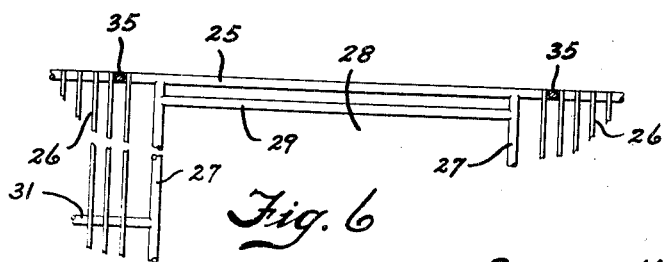
Fig. 6 is a fragmentary horizontal sectional view taken on the line 6—6 of Fig. 3 showing a rear portion of the shelf.

The shelves 18 and 19 are disposed one above the other and divide the interior of compartment 12 into superimposed food storage spaces or chambers 21 and 22. The lower-most shelf 19 is of the conventional substantially flat reticulated type and its food supporting surface extends continuously throughout the face area thereof. The upper-most shelf 18 includes a round metal bounding rim 25 and metal crossrods 26 secured thereto and extending from the front to the rear of the shelf (see Fig. 4). The rim 25 has leg portions 27 bent inwardly from the portions thereof at the front of the shelf 18 and the ends of these leg portions 27 abut the portion of the rim extending along the back of the shelf (see Fig. 6) and are welded or otherwise secured thereto. Leg portions 27 of rim 25 extend parallel to the side edges of shelf 18 to define an unobstructed open portion 28 in the shelf. The bent-in legs 27 of rim 25 provide an unobstructed mouth for the open portion 28 of shelf 18 at the front of the shelf. A metal brace member 29 of round cross-section extends between and is secured to the bent-in legs 27 of shelf rim 25 (see Figs. 5 and 6) and is disposed adjacent and parallel with the rim portion extending along the back of the shelf 18. The walls 27 of the open portion 28 of shelf 18 provide a set or pair of horizontally spaced apart ledges or supports within the horizontal plane of the shelf for supporting a food storage receptacle 30, the purpose of which will be hereinafter more fully described. A brace member 31 extends from the rim 25 at each side edge of shelf 18 to a leg 27 and is secured thereto for increasing the structural strength of the shelf. The parts of shelf 18 thus far described are all disposed in substantially the same horizontal plane to provide a relatively flat recticulated structure.

Shelf structure 18 also includes a pair of metal members 33 of round cross-section extending parallel to the legs 27 of rim 25 and disposed in vertical spaced apart relation thereto. Each member 33 has a portion 34 extending in the same horizontal plane therewith and bent at right angles thereto. Each member 33 also has a portion 35 formed integral with the portion 34 thereof and extending downwardly to the rim 25 of shelf 18. The end of each portion 35 of members 33 is welded or otherwise permanently secured to the rim 25 at a point spaced from the legs 27 thereof. A metal brace member 37 of round cross-section extends between the horizontally spaced apart members 33 and has its ends welded or otherwise suitably secured thereto. This brace 37 is disposed over the brace 29 and tends to increase the structural strength of the two members 33 secured to the rim 25 of shelf 18. It will be noted that the portions 35 of members 33 locate the members 33 a substantial distance above the legs 27 of rim 25 and also provide the shelf structure 18 with a second set or pair of horizontally spaced apart ledges or supports above the horizontal plane of the shelf for the support of the receptacle 30. The cross members 29 and 37 in addition to strengthening the shelf structure also form stops at the rear of the shelf 18 for the receptacle 30.

I have described a structure which is capable of permitting the objects of my invention to be carried out, and it will be noted that the open portion 28 in shelf 18 is disposed below and in substantially vertical alignment with the evaporator or heat absorber 11. The receptacle 30 may be made of metal or glass and has an outwardly directed top rim or flange which when supported upon either set of ledges or supports 27 or 33 permits the bottom of the receptacle to form the bottom wall of an unobstructed space below the evaporator 11. The receptacle 30 is selectively supportable upon either of the sets of ledges or supports 27 and 33 and is adapted to contain food products of various size for storage in substantially the coldest portion of the compartment 12 which is that immediately below the evaporator.

Figure 2:
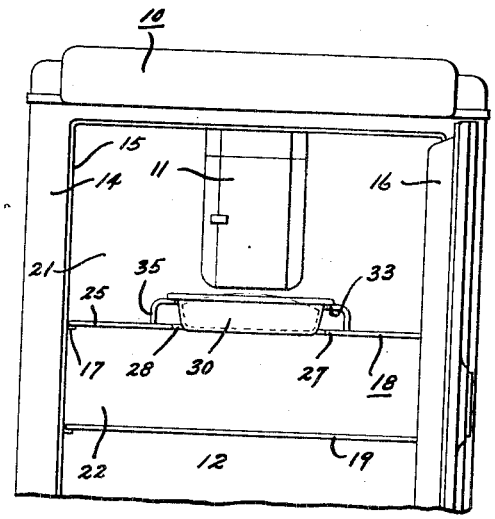
Fig. 2 is a view similar to Fig. 1 showing the shelving supporting the pan in another position below the evaporator.

When the receptacle or tray 30 is to be utilized as a collector or reservoir for water dripping from evaporator 11, during defrosting thereof, it is preferably supported upon the upper set of ledges 33 as shown in Fig. 2 of the drawings so as to prevent splashing of water from the receptacle. When relatively small pieces of meat are to be stored in receptacle 30, during production of refrigeration by evaporator 11 and between defrosting periods thereof, the receptacle is preferably supported upon the upper set of ledges 33 so that the receptacle 30 will not occupy a portion of the food storage space 22 below shelf 18 to thereby afford maximum food storage capacity within the refrigerator cabinet 10. However, when large pieces of meat such as roasts or poultry are to be stored in receptacle 30, the receptacle is moved from its upper supports 33 and supported upon the lower supports or ledges 27 as shown in Fig. 1 of the drawings, so as to increase the height of the unobstructed storage space between the receptacle and the evaporator 11 for the reception of the meat which projects a substantial distance above the top of the receptacle 30. The support of receptacle 30 in its lowermost position also permits emptying of a great quantity of ice blocks, from ice trays removed from the freezing compartment of evaporator 11, into the receptacle and storage of these blocks in the receptacle while other blocks are being frozen in the tray within the evaporator. Thus, when a demand for a great number of ice blocks is known in advance, the relatively small refrigerating apparatus disclosed can be arranged to meet this demand. The receptacle 30 may be changed from its upper portion of support within food compartment 12 of cabinet 10 to its lower position of support by sliding same outwardly of shelf 18 through the unobstructed front edge thereof, or through the mouth of the open portion 28 of the shelf. The receptacle 30, after being moved outwardly of shelf 18 through the food compartment access opening 15, can be raised or lowered at will relative to the food supporting surface of the shelf 18 and selectively supported upon either set of ledges or supports 27 or 33 within the unobstructed open portion 28 of the shelf. While I have disclosed the receptacle 30 as being supportable in two positions only beneath the evaporator 11, it is to be understood that I may provide three or more positions of support for the receptacle without departing from the spirit of the invention.

From the foregoing, it will be seen that I have provided an improved refrigerating apparatus and particularly that I have greatly facilitated the storage of food products within a refrigerated compartment of a refrigerator cabinet by increasing the utility of a drip-water receiving tray normally disposed below the evaporator of a refrigerating apparatus of the type disclosed. The receptacle disposed below the evaporator in the structure disclosed provides additional food storage space within the refrigerated compartment and since the receptacle can be supported in different vertically disposed positions relative to the bottom of the evaporator, a wide variety of foods may be stored in the receptacle and in substantially the coldest portion of the refrigerator. My improvement is particularly important since the selling price of a refrigerating apparatus is usually determined by the food storage capacity or area and features of food storage arrangements within the refrigerated compartment of the refrigerator cabinet thereof.

While the form of embodiment of the invention, as herein disclosed, constitutes a preferred form, it is to be understood that other forms might be adopted, all coming within the scope of the claims which follow.

What is claimed is as follows:

1. A shelf for disposition in a food storage chamber of a refrigerator cabinet, said shelf including a food supporting surface at one side thereof, said shelf having a plurality of integral portions forming an opening therein, said integral shelf portions comprising two sets of vertically spaced apart ledges extending along opposite sides of the opening therein for receiving and supporting a food storage receptacle, and said two sets of ledges serving to selectively support the receptacle on either set thereof within the opening in said shelf to thereby vary at will the position of elevation of the receptacle within the food storage chamber of the refrigerator cabinet.

2. A shelf for disposition in a food storage chamber of a refrigerator cabinet, said shelf including a food supporting surface at one side thereof, said shelf having a plurality of integral portions forming an opening therein, said integral shelf portions comprising two sets of vertically spaced apart ledges extending along opposite sides of the opening therein for receiving and supporting a food storage receptacle, said two sets of ledges serving to selectively support the receptacle on either set thereof within the opening in said shelf, and said shelf opening being unobstructed along the front of the shelf to permit sliding of the receptacle outwardly of the shelf and raising or lowering of the receptacle for varying at will the position of elevation of the receptacle within the food storage chamber of the refrigerator cabinet.

SYLVESTER M. SCHWELLER.